United States Patent [19]

Yamada et al.

[11] 4,406,673
[45] Sep. 27, 1983

[54] ULTRATHIN SOLID MEMBRANE, PROCESS FOR PRODUCTION THEREOF, AND USE THEREOF FOR CONCENTRATING A SPECIFIED GAS IN A GASEOUS MIXTURE

[75] Inventors: Takeyoshi Yamada; Shizuka Kurisu; Shizuo Azuma; Kiyoshi Sugie; Teizo Yamaji, all of Iwakuni, Japan

[73] Assignee: Teijin Limited, Osaka, Japan

[21] Appl. No.: 217,582

[22] Filed: Dec. 18, 1980

[30] Foreign Application Priority Data

Dec. 27, 1979 [JP] Japan .................. 54-169461
Jun. 2, 1980 [JP] Japan .................. 55-72678
Jul. 14, 1980 [JP] Japan .................. 55-95057
Nov. 6, 1980 [JP] Japan .................. 55-155197
Nov. 6, 1980 [JP] Japan .................. 55-155198

[51] Int. Cl.³ .................. B01D 53/22; B01D 39/16
[52] U.S. Cl. .................. 55/16; 55/158; 264/45.1
[58] Field of Search .................. 264/298, 41, 45.1; 55/16, 158; 210/640, 500.2; 525/42, 106

[56] References Cited

U.S. PATENT DOCUMENTS 3,551,244 12/1970 Forester et al. ............. 264/298 X
3,615,024 10/1971 Michaels .................... 210/500.2 X
3,950,247 4/1976 Chiang et al. .............. 210/640 X
4,132,824 1/1979 Kimura et al. ............. 525/106 X
4,197,148 4/1980 Shinomura ................. 210/500.2 X Primary Examiner—Frank A. Spear, Jr.
Attorney, Agent, or Firm—Sherman & Shalloway

[57] ABSTRACT

A process for producing ultrathin solid membranes from a solvent solution of an addition polymer derived from an ethylenically unsaturated hydrocarbon monomer or a conjugated unsaturated hydrocarbon monomer in a solvent composed mainly of a volatile, substantially water-immiscible organic liquid medium capable of dissolving the addition polymer and another organic compound having a distribution coefficient k, which is the ratio of the concentration of the other organic compound in the organic liquid medium to that in water, of from 0.5 to 35. The solvent satisfies the equation $$c_1 - (a_1 + b_1) \geq 25$$

wherein $c_1$ is the surface tension (dynes/cm) of water, $a_1$ is the surface tension (dynes/cm) of the solution of the addition polymer in the solvent, and $b_1$ is the interfacial tension (dynes/cm) between the solvent solution and water.

The solvent solution of the addition polymer is allowed to spread spontaneously on the surface of a liquid support consisting substantially of water whereby the solvent in the solvent solution is removed to an amount sufficient to form a solid membrane on the surface of the liquid support. The process may be performed batchwise or continuously. The solid membrane can be used for obtaining a gas having a specified component gas concentrated therein, for example, a gaseous mixture having enriched oxygen gas from a gaseous mixture of two or more gases for example air.

29 Claims, 6 Drawing Figures

ULTRATHIN SOLID MEMBRANE, PROCESS FOR PRODUCTION THEREOF, AND USE THEREOF FOR CONCENTRATING A SPECIFIED GAS IN A GASEOUS MIXTURE

BACKGROUND OF THE INVENTION

1. Field of the Invention

This invention relates to an ultrathin solid membrane, a process for production thereof, and use thereof for concentrating a specified gas such as oxygen gas in a gaseous mixture such as air.

2. Field of the Invention

For some years, there has been a marked advance in membrane-dependent separation techniques in various fields. A technique for separating a gaseous mixture using a membrane, however, is a relatively recent technological development. The technical difficulty of separating a specified gas from a gaseous mixture lies in the development of a material capable of permitting permeation of the specified gas with sufficient selectivity and at a sufficient permeating speed and also in the establishment of a technique for forming such a material into a very thin membrane having a uniform thickness and a large area.

Generally, the amount of a gas permeating a homogeneous membrane is defined by the following equation.

$$X = P \times (P_1 - P_2) \times A/l$$

wherein

X represents the permeating velocity [cc(STP)/sec.] of the gas,

P is the permeation coefficient [cc(STP)x·cm/cm²·cmHg.sec] of the gas, ($P_1 - P_2$) is the difference of the partial pressures (cmHg) of the gas on both surfaces of the membrane, A represents the area (cm²) of the membrane, and l is the thickness (cm) of the membrane.

It is clear therefore that once the material of which the membrane is made and a gas to be permeated are specified, the amount of permeation of the gas depends upon the thickness and area of the membrane. It is desired to make the membrane thickness as small as possible and the area of the membrane as large as possible.

As a prior attempt to produce a membrane having a small thickness and a large area, there is known a process for producing an ultrathin membrane by a batchwise technique, which comprises dropping a solution of a blend of a methylpentene polymer and an organopolysiloxane-polycarbonate copolymer in a solvent onto the surface of water to allow the solution to spread spontaneously on the surface of water (see U.S. Pat. No. 4,192,842). As described in the specification of this Patent, the use of the organopolysiloxane-polycarbonate copolymer makes it possible for the solution to spread spontaneously on the surface of water. The specification of this U.S. patent also describes a method involving the use of a solution of the methylpentene polymer alone in a solvent. Investigations of the present inventors, however, have shown that the method using such a solution which does not contain the organopolysiloxane-polycarbonate copolymer did not lead to the successful production of an ultrathin membrane having a uniform thickness and a large area. Thus, although the method disclosed in the above cited U.S. Pat. No. 4,192,842 involving the use of a solvent solution of the methylpentene polymer alone is one attempt at the production of an ultrathin membrane, it is at least not easy to produce an ultrathin membrane having a uniform thickness and a broad area suitable for practical application.

U.S. Pat. No. 4,132,824 from which the above-cited U.S. Pat. No. 4,192,842 was divided out claims only an ultrathin membrane comprising a blend of a methylpentene polymer and an organopolysiloxane-polycarbonate copolymer.

U.S. Pat. No. 4,155,793 discloses a process for continuously producing a composite laminar membrane consisting of a web and two thin polymeric films held thereon in the superimposed state, which comprises feeding solvent solutions of polymer into two wells provided in opposing directions on the surface of an aqueous medium to spread the solvent solutions on the surface of the aqueous medium, and continuously feeding a web coming into the aqueous medium at a position intermediate between the two wells thereby to hold on the web two thin films formed from the solvent solutions spread on the water surface. This process is characteristic in that two thin films are continuously formed on a stationary aqueous medium, and these two films are simultaneously held on one web and continuously recovered from the surface of the stationary aqueous medium.

The ultrathin film produced by such a process is used generally for producing an oxygen-enriched gaseous mixture from air, as is disclosed in the specification of the above-cited U.S. Patent. Such a use is embodied as a device for obtaining an oxygen-enriched gas from air in the specifications of U.S. Pat. Nos. 3,976,451 and 4,174,955.

It is an object of this invention therefore to provide a process for producing from a hydrocarbon addition polymer a very thin membrane having a uniform thickness and a substantially equivalent gas separation factor to the inherent gas separation factor of the addition polymer.

Another object of this invention is to provide a process which comprises dissolving a hydrocarbon addition polymer in an organic solvent which has a suitable surface tension with respect to water to form a solvent solution of the polymer which has a suitable surface tension with respect to water, whereby a very thin solid membrane having a uniform thickness and the desired gas separation factor is formed on the surface of water.

Still another object of this invention is to provide an ultrathin solid membrane having a uniform thickness, the desired gas separation factor and a large area.

Yet another object of this invention is to provide a process for continuously producing an ultrathin solid membrane having the above properties by carrying it on a porous sheet-like material.

A further object of this invention is to provide use of an ultrathin solid membrane having the above properties for the production of a gas containing a specified component gas (e.g., oxygen gas) concentrated from a gaseous mixture (e.g., air) of two or more gases.

An additional object of this invention is to provide a module used to concentrate a certain gas by using a solid membrane having the aforesaid properties, and an oxygen enricher comprising the aforesaid module for producing an oxygen-enriched gas from the air.

Other objects and advantages of this invention are apparent from the following description.

SUMMARY OF THE INVENTION

According to one basic concept of this invention, these objects and advantages are achieved by a process for producing an ultrathin solid membrane, which comprises dissolving an addition polymer derived from at least one monomer selected from the group consisting of ethylenically unsaturated hydrocarbon monomers and conjugated unsaturated hydrocarbon monomers in a solvent composed mainly of a volatile, substantially water-immiscible organic liquid medium capable of dissolving the addition polymer, said solvent containing, if desired, another organic compound having a distribution coefficient k, which is the ratio of the concentration of the other organic compound in the organic liquid medium to that in water, of from 0.5 to 35, and said solvent meeting the following equation $$c_1 - (a_1 + b_1) \geqq 25$$

wherein $c_1$ is the surface tension (dynes/cm) of water, $a_1$ is the surface tension (dynes/cm) of the solution of the addition polymer in the solvent, and $b_1$ is the interfacial tension (dynes/cm) between the solvent solution and water, and thereafter allowing the solvent solution of the addition polymer to spread spontaneously on the surface of a liquid support consisting substantially of water whereby the solvent in the solvent solution is removed to an amount sufficient to form a solid membrane on the liquid surface.

The procedure of the process of this invention involves dissolving a hydrocarbon addition polymer in a solvent composed mainly of a substantially water-immiscible organic liquid medium, and allowing the resulting solvent solution to spread spontaneously on the surface of a liquid support consisting substantially of water.

DETAILED DESCRIPTION OF INVENTION

Thus, one feature of the present invention is that a volatile organic liquid medium capable of dissolving the hydrocarbon addition polymer is used as the substantially water-immisicible organic liquid medium, and a solvent consisting mainly of the aforesaid organic liquid medium has liquid surface characteristics meeting the following equation, $$c_1 - (a_1 + b_1) \geqq 25 \qquad \ldots (1\text{-a})$$

preferably $$c_1 - (a_1 + b_1) \geqq 35 \qquad \ldots (1\text{-b})$$

wherein all symbols are as defined above.

By using a medium having such liquid surface properties, the resulting solvent solution spreads spontaneously, uniformly and rapidly on the surface of a liquid support consisting substantially of water.

Investigations of the present inventors have shown that a mixture of a certain kind of medium as described above and another organic compound having a distribution coefficient (k) of from 0.5 to 35, preferably from 1.0 to 25, is preferred as the solvent composed mainly of such a medium. The distribution coefficient (k) is the ratio of the concentration of the other organic compound in the organic liquid medium to that in water.

The hydrocarbon addition polymer used in this invention is obtained from at least one monomer selected from hydrocarbon monomers having an ethylenically unsaturated bond and hydrocarbon monomers having a conjugated unsaturated bond.

Preferably, it is an aliphatic or cycloaliphatic compound having 2 to 20 carbon atoms, especially 4 to 10 carbon atoms. Examples of the hydrocarbon monomer are ethylenically unsaturated hydrocarbon monomers such as ethylene, propylene, butene, isobutene, pentene, methylpentene, hexene, methylhexene, heptene, cyclohexylpentene, styrene, α-methylstyrene, and mixtures of these; and conjugated unsaturated hydrocarbon monomers such as butadiene, isoprene, cyclooctadiene and mixtures of these.

Processes for producing addition polymers from these monomers are known to those skilled in the art.

The addition polymer used in the process of this invention may be a homopolymer or copolymer of such a monomer. The copolymer may be a random, graft or block copolymer. The homopolymer is preferred. Examples of the homopolymer include polyethylene, polypropylene, polybutene, polyisobutene, polypentene, polymethylpentene, polyhexene, polymethylhexene, polyheptene, polycyclohexylpentene, polystyrene, poly(α-methylstyrene), poly(1,4-butadiene), poly(1,2-butadiene), polyisoprene, and polycyclooctadiene.

These addition polymers may be used singly or as a mixture of two or more.

Among these, polybutene, polypentene, polymethylpentene, polyhexene, polymethylhexene, polybutadiene and polyisoprene are preferred, and polymethylpentene is especially preferred. These preferred polymers have a relatively high gas permeability and pressure resistance and do not soften at room temperature.

In the process of this invention, a solution of such an addition polymer in the solvent described above is used. The suitable concentration of the polymer in the solvent solution is about 0.5 to about 15% by weight, preferably about 1 to about 10% by weight.

Such a dilute solvent solution permits a broader range of selection of water-immiscible organic liquid media which meet equation (1-a) and are usable in this invention, and spreads on the surface of a liquid support consisting substantially of water spontaneously, uniformly and rapidly. The low concentration of the solvent solution does not constitute an obstacle when the medium is removed almost completely by volatilization on the liquid surface to form a very thin solid membrane on the liquid surface.

In the process of this invention, a hydrocarbon or a halogenated hydrocarbon may be used as the water-immiscible organic liquid medium capable of forming the solvent used in providing such a solvent solution. The hydrocarbon or halogenated hydrocarbon are preferably alicyclic or aromatic. Examples include cyclohexene, cyclohexane, trichloroethylene, tetrachloroethylene, trichloroethane, trichloropropane and mixtures of these.

These water-immiscible organic liquid media are volatile and can dissolve the aforesaid hydrocarbon addition polymers, but when used alone, they do not have the liquid surface properties defined by equation (1-a).

Solvents which meet equation (1-a) are provided by mixing such a water-immiscible organic liquid medium with another organic compound having a distribution coefficient, k, of 0.5 to 35, preferably 1.0 to 25. Solvents of this type are preferred in the process of this invention.

Examples of the other organic compound are alicyclic or aromatic alcohols, ketones, amines, aldehydes, carboxylic acids, peroxides and mixtures of these. For example, cyclohexenol, cyclohexanol, phenol, cyclohexenone, cyclohexylamine, aniline, furfural, benzoic acid, cyclohexenyl hydroxy peroxide, and mixtures of these are especially preferred.

The amount of the other organic compound is about 0.1 to about 15% by weight, preferably about 0.5 to about 10% by weight, based on the solvent.

The presence of the other organic compound in the solvent serves to convert a water-immiscible organic liquid medium, which despite its volatility and ability to dissolve the addition polymer used in this invention, cannot by itself be used in the process of this invention for producing an ultrathin solid membrane having a uniform thickness, a large area, and a substantially equivalent gas separation factor to the inherent gas separation factor of the addition polymer, into a solvent suitably used in the process of this invention.

It is believed that the other organic compound is mostly removed by being dissolved in the liquid support consisting substantially of water from the solvent solution of the addition polymer in the water-immiscible organic liquid. Since most of the water-immiscible organic liquid medium in the solvent solution is removed by volatilization on the liquid support, the process of this invention may be expressed phenomenally as a process for producing a very thin solid membrane on a liquid support by using a compound soluble in the liquid support and a water-immiscible organic liquid medium which volatilizes into the ambient atmosphere.

The ultrathin solid membrane obtained by the process of this invention, therefore, is composed of the addition polymer not containing the other organic compound in a substantially appreciable amount without subjecting it to any special treatment after it has been separated from the liquid support.

The process of this invention is carried out by feeding the solvent solution of the addition polymer gently onto a liquid support consisting substantially of water. The solvent solution, as already described hereinabove, spontaneously spreads on the surface of the liquid support. Accordingly, no special operation is required for spreading the solvent solution. The solvent solution releases the solvent therefrom while spreading, and gradually solidifies on the surface of the liquid support. Releasing of the solvent, namely the removal of the solvent from the solvent solution, does not require any special operation, as already stated hereinabove.

The surface of the liquid support should not be vibrated, or the thin film should not be rippled at least before it is solidified on the liquid surface.

The solvent solution is fed to the liquid support from a feed means which is in contact with the surface of the liquid support or is provided in its neighborhood. Desirably, the feeding is effected in the direction of gravity. When the solvent solution is to be fed from a feed means provided in the vicinity of the liquid surface, the feed means may be situated above or below the liquid surface. The feed means may be a feed opening. When it is located on the liquid surface, it may be a slender linear material. In this case, the solvent solution is fed along the slender linear material. The suitable length of the linear material is less than about 10 cm, preferably less than about 5 cm. The feed means may be positioned up to about 3 mm, preferably up to about 2 mm, above the liquid surface, or up to about 2 mm, preferably up to about 1 mm below the liquid surface.

When the feed means is a feed opening, it may be of any shape if it is adapted to feed the solvent solution continuously or intermittently at such a rate that the solvent solution fed onto the liquid surface spontaneously spreads and forms a solid membrane having a uniform thickness. Since the solvent solution is usually fed as a dilute solution of the addition polymer, the feed opening preferably does not have so large an area. Usually, a slit of narrow width, a slender linear material, or a feed opening of a small area having any desired shape such as a circle or polygon is usually employed. The slit having a narrow width preferably has an opening width of about 0.001 to about 1 mm. The circular or polygonal feed opening with a small area preferably has an opening area of about 0.01 to about 3 mm$^2$, preferably 0.05 to about 2 mm$^2$.

Preferably, the feed means is a circular or polygonal (e.g., triangular, hexagonal, etc.) opening with a small area. Such a feed means may be the tip of a slender hollow tube, and the tip may be sharpened.

The solvent solution fed to the liquid support spreads rapidly and spontaneously on the liquid surface, and simultaneously with, or subsequently to, the spreading, gradually releases the solvent and finally solidifies, as stated hereinabove.

The temperature of the solvent solution at the time of feeding is a factor which affects surface tension and interfacial tension, but is not so important from the standpoint of controlling these tensions because it is believed that the temperature of the solvent solution fed to the liquid support rapidly approaches the temperature of the liquid support. Rather, the temperature of the solvent solution at the time of feeding is significant as a temperature which gives the solvent solution. From this standpoint, therefore, the temperature of the solvent solution may be about 10 to about 100° C., preferably about 20° to about 70° C.

As stated above, the temperature of the solvent solution fed to the liquid support is believed to approach the temperature of the liquid support rapidly. Accordingly, the temperature of the liquid support affects the surface tensions of the solvent solution and the liquid support and the interfacial tension between them and also greatly affects the speed or degree of spontaneous spreading of the solvent solution on the liquid support. Thus, when the temperature of the liquid support is too high, volatilization of the solvent from the solvent solution increases too much, and the desired speed and degree of spreading are difficult to obtain. On the other hand, when the temperature of the liquid support is too low, the volatilization of the solvent is too slow, and the speed of solidification is decreased.

In the process of this invention, the temperature of the liquid support is generally about 0° to about 80° C., preferably about 1° C. to about 50° C., more preferably about 3° C. to about 30° C.

For example, when in accordance with the process of this invention, one drop of a solution of 5 parts by weight of poly-4-methylpentene in 100 parts by weight of a cyclohexene solvent containing 4.75% by weight of cyclohexenyl hydroxyperoxide is fed onto a liquid support composed of water through from a feed opening having an opening area of about 0.3 mm$^2$, the solvent solution spontaneously spreads on the liquid surface immediately upon feeding, and solidifies in several seconds, for example 1 to 2 seconds, to form a solid membrane.

The process of this invention can be performed either batchwise or continuously. By the batchwise operation, a solidified membrane is formed intermittently on the surface of the liquid support, and by the continuous operation, a solid membrane is continuously formed on the surface of the liquid support.

The batchwise operation is carried out, for example, by feeding the solvent solution in drops to the liquid support, and the continuous operation is carried out, for example, by continuously feeding the solvent solution onto the liquid support.

According to the continuous process, a solid membrane having a broad area can be easily produced. Since the solid membrane formed on the liquid support by the process of this invention has a very small thickness, its self-supporting property is low. Accordingly, the solid membrane formed on the liquid support is usually separated from the liquid support by supporting it on another supporting carrier.

According to this invention, the process by the continuous operation is carried out by continuously feeding a solvent solution of an addition polymer onto the surface of a liquid support consisting substantially of water from a feed means so that the solvent solution does not depart from the liquid surface of the liquid support to allow the solvent solution to spread spontaneously on the liquid surface thereby continuously removing the solvent in the solvent solution to an amount sufficient to form a solid membrane, and thereafter continuously withdrawing the ultrathin solid membrane above the liquid surface while carrying it on a porous sheet-like material.

Since the solvent having the aforesaid liquid surface property is used, the solvent solution used in the process of this invention has very good spreadability on the liquid support, and therefore provides a solid membrane having a broad area, a very small thickness and a substantially equivalent gas separation factor to the inherent gas separation factor of the addition polymer.

The solvent solution of the process of this invention having such good spreadability is firstly very desirable for continuously producing a solid membrane of a large width using a feed means, preferably a circular or polygonal feed opening having a small opening area.

A second feature of the process of this invention by the continuous operation is that the solvent solution is fed from the feed means so that it does not depart from the surface of the liquid support. When the solvent solution is fed at a site away from the liquid surface, for example in drops, to the liquid surface, the resulting solid membrane has a striped pattern of non-uniform thickness attributed to the individual drops of the solvent solution, and therefore, it is difficult to obtain a solid membrane having a uniform thickness and the desired separation factor.

In order to perform such desirable feeding of the solvent solution, it is necessary to provide the feed means in contact with, or in proximity, to the liquid surface of the liquid support.

The rate of feeding the solvent solution varies depending upon the type of the feed means, the volatilizability of the solvent, etc. But when it is to be fed through a preferred feed opening having a small operning area and being circular or polygonal, it is for example, about 0.1 to about 20 cc/min, preferably about 0.3 to about 10 cc/min.

The liquid support may be stationary, or if its surface maintains a smooth plane, may be flowing. Preferably, the liquid support is flowing from the feed opening for the solvent solution toward a site of separating the resulting solid membrane from the liquid support. By causing the liquid support to flow, the solvent solution rides on the flow of the liquid support and spreads spontaneously. Accordingly, continuous variation from the solution to the solid membrane proceeds very smoothly, and therefore, a solid membrane having a more uniform thickness and the desired gas separation factor can be formed.

The solid film membrane formed on the liquid support is separated and withdrawn from the support surface of the liquid support continuously while it is carried on a porous sheet-like material.

The porous sheet-like material usually moves at a fixed speed and is adapted to get submerged in the liquid support and again come out onto the liquid surface. The porous sheet-like material can move such that it separates the solid film from the liquid surface when it gets submerged in the liquid support or when it comes out from the liquid support. The speed of movement of the porous sheet-like material is desirably substantially equal to the speed of formation of the solid membrane. In other words, care should be taken so that when the solid membrane is separated from the liquid surface, a high tension is not exerted on the solid membrane or the solid membrane does not get loose. Investigations of the present inventors have shown that this suitable speed can be determined by taking up the solid membrane forcibly at a nearly constant speed on the liquid surface of the liquid support in the flowing direction of the liquid support to form a substantially stabilized flow of the solid membrane before the solid membrane formed on the liquid surface is carried on the porous sheet-like material, and then moving the porous sheet-like material at a speed substantially coinciding with the speed of the flow of the solid membrane.

The process for producing a solid membrane by the continuous operation in accordance with this invention is described in more detail below with reference to the accompanying drawings.

BRIEF DESCRIPTION OF THE DRAWINGS

Referring to FIGS. 1 and 2, a smooth liquid surface 14 of a liquid support 15 is formed in a liquid support tank 10. Usually, the liquid support 15 can be water. A water supplying pipe 24 provided in the tank 10 has a plurality of water supply openings 25 for continuously supplying water to the tank 10. The level of the liquid surface 14 in the tank 10 is defined by the height of a dam 29. In other words, water overflows beyond the dam 29. In the drawings, water flows from the water supply openings 25 toward the dam 29. The water which has overflowed beyond the dam 29 is discharged out of the tank 10 from a water discharge outlet 32. The temperature of water is adjusted to a constant point by a temperature control device (not shown).

Figure 1:
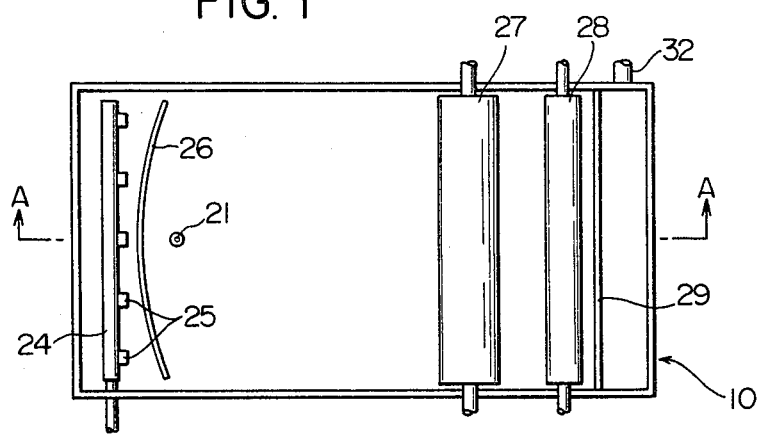
FIG. 1 is a schematic top plan view of an apparatus suitably used for the production of a solid membrane by the continuous process of this invention.

A feed opening 21 for a solvent solution of the addition polymer which is located in contact with the liquid surface 14 exists at the end of a hollow pipe extending from a reservoir 20 for the solvent solution. The reservoir 20 includes a heater 22 for heat insulation or heating which is adapted to maintain the temperature of the solvent solution at a desired point, and a plunger 23 for continuously feeding the solvent solution at a constant rate to the liquid surface 14 from the reservoir 20 through the feed opening 21.

The solvent solution which is continuously fed at a constant rate to the liquid surface 14 is guided by a guide plate 26 projecting upwardly beyond the liquid surface 14 and by the flow of water, spontaneously spreads on the flow of water both in the water flowing direction and in a direction at right angles thereto. The guide plate 26 serves to prevent the solvent solution supplied to the liquid surface 14 from spreading in a direction opposite to the water flowing direction, and aids in spreading of the solvent solution in a direction, at right angles to the water flowing direction. For this purpose, the guide plate 26 is preferably curved so that its center is located on the side of the feed opening 21. Especially preferably, the guide plate 26 has a radius of curvature of about 10 cm to about 1 meter. The feed opening 21 is preferably located on the central line of the arc of the guide plate 26 at a position about 0.2 cm to about 10 cm away from the guide plate 26.

The solid membrane 11 formed on the liquid surface 14 is carried by a porous sheet-like material 12 when the sheet-like material is submerged in the water. The porous sheet-like material 12 is supplied from a feed roller 30 and taken up via a rotatable shaft 27 and a guide roller 31. Thus, a solid membrane 13 supported on the porous sheet-like material 12 is obtained.

In the drawings, the reference numeral 28 represents a wind-up roller which is used to form a stable constant flow of the solid membrane on the liquid surface before the solid membrane is carried on the porous sheet-like material.

Preferably, the feed opening-facing side of the guide plate 26 and the side wall of the water tank 10 in the solid membrane-forming zone (i.e., the side wall ranging from the guide plate 26 to the rotatable shaft 27) are made of a material which does not permit adhesion of the solid membrane or of a material whose surface is treated with that material. For example, fluorocarbon resins such as polytetrafluoroethylene and copolytrifluoroethylene-hexafluoropropylene are used as the material which does not permit adhesion of the solid membrane, and silicone oils such as dimethylpolysiloxane are used as a surface-treating material having the same property.

According to the process of this invention operated by the continuous procedure, an endless solid membrane having a width of as large as about 70 cm can be easily produced, and under optimum conditions, a solid membrane with a width of about 1 m may be produced.

The solid membrane provided by this invention is extremely thin, and has a uniform thickness and excellent gas separating ability. In particular, the solid membrane produced continuously by the process of this invention and supported on the porous sheet-like material has a broad area in addition to having the aforesaid properties. Accordingly, it can be used for the production of a gas containing a specified component gas such as oxygen concentrated therein from a mixture of at least two gases, such as air.

The porous sheet-like material makes up for the weak self-supporting ability of the solid membrane of this invention, and scarcely affects the gas separation ability of the solid membrane of this invention.

The porous sheet-like material may be any of sheet-like materials having a number of small pores, smoothness and self-supporting property, such as Japanese paper, nonwoven cloths, synthetic paper-like sheets, filter papers, cloths, wire nets, filtration membranes, ultrafiltration membranes, and porous films. Preferred porous sheet-like materials include porous polyethylene films (e.g., Celpore, a trademark for a product of Sekisui Chemical Co., Ltd.), porous polypropylene films (e.g., Celgard, a trademark for a product of Celanese Corporation), cellulosic ultrafiltration membranes (e.g., Fuji-Microfilter, a trademark for a product of Fuji Film Co., Ltd.), porous polycarbonate films (e.g., Nuclepore, a trademark for a product of Nomura Microscience Co., Ltd.), and polysulfone-type ultrafiltration membranes (e.g., Toyo-ultrafilter, a trademark for a product of Toyo Filter Paper Co., Ltd.). The porous polypropylene films are especially preferred because of their good adhesion to the solid membrane of this invention.

If desired, two or more solid membranes of this invention may be supported as a laminated layer on the porous sheet-like material. Particularly, an assembly of two solid membranes of this invention supported in a laminated layer on the porous sheet-like material (preferably the total thickness of the membranes should be adjusted to about 50 to about 5000 Å) exhibits excellent gas separating ability when used in separation of gases, and in most cases, shows a gas separation factor equivalent to the inherent gas separation factor of the addition polymer forming the solid membrane. It is rare therefore that more than two solid membranes of this invention should be laminated in order to obtain the desired gas separating ability. To superimpose two or more solid membranes of this invention on the porous sheet-like material, the process of this invention by the continuous operation is carried out, for example, in the same way as described above except that a porous sheet-like material having supported thereon one solid membrane of this invention is used instead of the porous sheet-like material.

The porous sheet-like material having supported thereon the solid membrane of this invention (which is sometimes referred to hereinbelow as a "composite film") can be used as prepared by the process described above for the separation of gases. Alternatively, before use in such an application, the composite film may be heat-treated under temperature and time conditions which do not cause melting of the solid membrane (for example, in the case of heating in an atmosphere, heating is carried out at a temperature of 60° to 300° C., preferably 80° to 200° C., for a period of 3 seconds to 50 hours, preferably 5 seconds to 20 hours) to improve adhesion between the solid membrane and the porous sheet-like material.

The solid membrane of this invention usually has a thickness of about 50 to about 3000 Å.

The solid membrane is used to obtain a gas having a specified component gas concentrated therein from a mixture of two or more gases, as stated hereinabove. For example, it is used in the production of oxygen-enriched air from atmospheric air, the production of $H_2$-enriched gas from a gaseous mixture containing $H_2$ and CO, the removal of $H_2O$ from a gaseous mixture containing $H_2O$, the removal of $SO_2$ and/or nitrogen oxide gases $NO_x$, from a gaseous mixture containing $SO_2$ and/or $NO_x$ and the production of a He-enriched gas from a gaseous mixture containing He. It is preferably used in the production of oxygen-enriched air (with an oxygen content of, for example about 30 to about 45%) from the atmospheric air.

In obtaining a concentrated gas by using the solid membrane of this invention, it is only necessary to provide a difference between the partial pressures of a gas to be concentrated on the two surfaces of the solid membrane. And as the ratio (high pressure/low pressure) between the partial pressures of the gas increases, there is obtained a gas in which the gas to be concentrated is more enriched. For example, in the production of oxygen-enriched air from the atmospheric air, the pressure of the atmospheric air fed to one surface of the solid membrane is increased to more than the atmospheric pressure and the pressure of the other surface is maintained at atmospheric pressure or reduced pressure. Or the pressure of the atmospheric air to be supplied to one surface is maintained at atmospheric pressure and the pressure of the other surface is reduced.

In order to obtain a gas having a specified gas concentrated therein from a gaseous mixture of two or more gases, it is convenient to use a module constructed by using the composite film in accordance with this invention. The present invention also provides such a module.

The module of this invention comprises a plurality of basic members for concentration of gases each of which consists of a solid support plate and the aforesaid composite film laminated on one or both surfaces of the solid support plate so that the porous sheet-like material of the composite film contacts the solid support plate. It is characterized in that (1) each of said members has a first gas drawing port for drawing off a gas having a specified gas concentrated therein, and the pressure drop in a passage for the concentrated gas in the member is not more than about 2 mmHg per cm in a direction away from the first gas drawing port;

(2) the module has a common feed port for feeding a mixture of at least two gases to the solid membrane surface of each member, a second drawing port connected to the first gas drawing port of each of said members, and a third common drawing port for drawing off the remaining gases formed as a result of concentration by each of the members; and (3) in each of the members, the flow of the gaseous mixture is countercurrent, or angularly displaced, to the flowing direction of the concentrated gas.

The critical feature of the module of this invention is that it has the second common gas drawing port connected to the first gas drawing port of each of the members for drawing the concentrated gas, and the pressure drop for the concentrated gas in each of the members is not more than about 2 mmHg per cm in a direction away from the first gas drawing port. The module of this construction is compact and light and has excellent separating efficiency.

In the members of this invention, the solid support plate can be effectively used by placing the solid membrane (composite film) on its surfaces. This means that the membrane area per member can be maximized. In other words, if the area of the solid membrane required for gas permeation is constant, the number of members can be maximized, and a compact and light-weight module can be built.

The solid support in the module of this invention has the dual function of stabilizing the form of the members to support the solid membrane and of forming a passage for a concentrated gas which has permeated through the solid membrane. If the gas has difficulty flowing through the passage, the pressure drop increases, and therefore, the difference between the pressures exerted on both surfaces of the solid membrane is small. Hence, the amount of the gas permeated decreases proportionally to such a difference in pressure.

It is known that separation of a gaseous mixture becomes better (the gas separating ability is better) as the ratio of the pressures exerted on both surfaces of the solid membrane (the ratio of the pressure on the higher pressure side to the pressure on the lower pressure side) increases. Accordingly, when the pressure drop in the passage is high, the pressure on the lower pressure side increases and the ratio of the pressures decreases. Consequently, the concentration of the desired gas in the concentrated gas obtained after permeation through the solid membrane decreases.

For this reason, the solid support plate is suitably of a structure which minimizes hampering of the passage for the concentrated gas which has permeated through the solid membrane, namely a structure which minimizes the pressure drop. A solid support plate in which the pressure drop is not more than about 2 mmHg, preferably not more than about 1.5 mmHg, more preferably not more than about 1 mmHg, per cm is preferred.

The pressure drop is measured in this invention in the following manner.

A sample having a length of 50 cm and a width of 25 cm is cut out from the member, and the entire surface of the sample is covered with a gas-barrier film. Both 50 cm-long ends of the sample are sealed gas-tight. To both 25 cm-long ends is connected a thick tubular flow opening through which a gas flows without resistance, for example a tube having a inside diameter of about 8 mm. One end of the tube is kept open and adapted for decreasing the opening area, and vacuum suction is effected from the other opening of the tube. When the flow rate of air is 1 liter/min. on the suction side, the pressures at both openings are measured, and the difference between them is defined as the pressure drop. The measurement is made at 25° C.

The solid support plate in the module of this invention is preferably a metal plate such as an aluminum plate, a Duralmin (tradename) plate, a plastic plate such as a polypropylene, hard vinyl chloride resin, fiber-reinforced polyethylene, terephthalate or unsaturated polyester plate, or a net-like article such as a stainless steel net or porous polypropylene plate. When the metal plate or the plastic plate other than the net-like article is used as the solid support plate, a spacer is used which forms a sufficient passage for a concentrated gas between the solid support and the composite film. The spacer may also be used when the solid support plate is a net-like article. Various kinds of nets, nonwoven fabrics, porous materials, etc. are used as the spacer. A member containing such a spacer can be built by laminating the net, nonwoven fabric, etc. either alone or in combination on one or both surfaces of the solid support, and further laminating the composite film of this invention onto the spacer. It is necessary in this case to laminate these materials such that the pressure drop in each member is within the above-specified range.

The spacer has an action of rendering the flow of a gas through the member easy when the net-like article is not used as the solid support plate, and its selection is especially important. The net preferably has coarse meshes and a raised-and-depressed pattern. It may be made of a plastic or metal, and plastic nets are preferred from the viewpoint of light weight. The plastic nets preferably have stiffness, and for this purpose, such materials as polypropylene, polyethylene terephthalate and polyamides may be used. Examples of commercially available nets are Vexor of Du Pont, Netlon of Tokyo Polymer Co., Ltd., and Nip nets of N.B.C. Industrial Co.

The nonwoven fabrics may be made from polyethylene terephthalate, polypropylene, polyethylene, polyamides, etc. For example, Unicell R Type of Teijin Limited, and MF Type of Japan Vilene are commercially available.

A preferred laminated structure in the member of the module of this invention consists of a metal plate, a net-like material of both surfaces of the metal plate, a non-woven fabric on both surfaces of the net-like material and a composite film laminated to the surfaces of the nonwoven fabric so that the porous sheet-like material contacts the non-woven fabric. A member of this structure shows an especially small pressure drop, has good durability and prevents deformation of the solid membrane of this invention. In particular, the use of the non-woven fabric is advantageous in avoiding rupture of the solid membrane which may occur in the absence of a nonwoven fabric as a result of deformation of the solid membrane along the profile of the net-like material (generally having coarse meshes and an uneven surface). The nonwoven fabric also has an action of making the flow of a gas easy. Accordingly, it is preferred that the nonwoven fabric should have a smooth surface and a smaller mesh opening size than the mesh opening size of the net-like material.

To make the entire module compact, the thickness of the member should preferably be as small as possible. It is generally not more than 5 mm, preferably not more than 4 mm, more preferably not more than 3 mm.

As stated hereinabove, the member used in this invention has the composite film on both surfaces of one solid support plate. A first gas drawing port is provided in this member in order to draw together the concentrated gas obtained after permeation through the two composite films. The first drawing port should have a cross-sectional area and a length which scarcely permit a pressure drop therein. The member having one drawing port for the two solid membranes is characterized by the fact that the number of drawing ports can be reduced to one-half as compared with a member having two drawing ports for two solid membranes, and the number of assembling pipes for assembling the concentrated gas from the drawing ports can be decreased, thus imparting a simple and convenient structure to the member and the module.

Excepting the drawing port, the entire periphery of the member is sealed up gas-tight. In other words, it is necessary to provide a structure which does not permit mixing of a feed gas and the concentration gas which has permeated through the solid membrane. To provide such a structure adhesives are preferably used. Examples of preferred adhesives are epoxy resins, and an ionomer resin (Sarlin A ®) formed into a film. When an adhesive in a film form (for instance, Sarlin A ® film) is used, uniform thickness and good gas-tightness can be achieved.

A plurality of members so produced are built into an array of the stacked members so as to prevent contact of the solid membranes with each other and also to provide a passage through which a gas flows along the outside surface of the solid membrane. The interval between the members is at least 1 mm, preferably at least 2 mm. A preferred array for the production of the module of this invention is the one in which the members at two opposite ends are composed of a solid support plate and the composite film laminated only to its one surface so as to avoid exposure of the solid membrane surfaces.

Spacers of any material are used between the members in building the array. From the viewpoint of the light weight of the module or the firmness of the members, the spacers are preferably made of a rubber or a plastic. It is sufficient that the spacers are located at the peripheral edges of the members, and are fixed to the member by, for example, an adhesive.

The array so built is then placed into a box capable of receiving it to provide the module of this invention. In the array within the box, the first gas drawing ports from the individual members are connected to a single assembling pipe. One end portion of the assembling pipe is drawn from the box to form a second gas drawing port from which the concentrated gas is drawn off.

The box further includes a common feed port for feeding a gas to be concentrated from outside the box, and a third common drawing port for drawing the gas remaining after drawing off the concentrated gas.

The gas to be concentrated which has been fed into the box from the common feed port is concentrated through the solid membranes of the members while it flows through the passages between the member, thereby giving a concentrated gas (which is drawn out of the box through the second common drawing port) to the inside of the solid membrane, and is discharged as the remaining gas out of the box through the third common drawing port.

Figure 4:
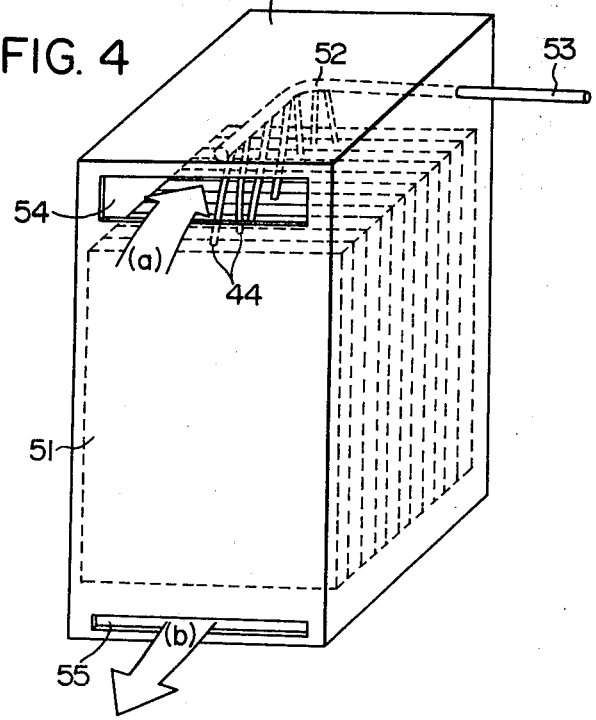

The gas to be concentrated which is flowing through the passages between the members of the array forms a flow which is countercurrent (for example, as shown in FIG. 4, the gas to be concentrated is introducd into the passage between the members from the direction of the first gas drawing port), or is angularly displaced (i.e., not concurrent), to the flowing direction of the concentrated gas given to the inside of the solid membrane. By forming such a flow, the module of this invention has an improved separating efficiency.

The module of this invention is advantageously used when a gas to be concentrated is fed at atmospheric pressure from the common feed port, and the second common drawing port from which the concentrated gas is drawn off is connected to a pressure reduction system to reduce the pressure of the passage for the concentrated gas. Such a module is light in washed and compact.

When, for example, oxygen-enriched air is produced from atmospheric air, the amount of the air to be fed to the module is usually at least 5 times, preferably at least 10 times, more preferably at least 30 times, the amount of oxygen-enriched air drawn from the module.

An apparatus for actually obtaining oxygen-enriched air from the atmospheric air using the module of this invention is embodied by an oxygen enricher provided by this invention.

The oxygen-enriched air (gas) obtained by the oxygen enricher of this invention can be used therapeutically for patients with diseases of the respiratory system such as asthma, emphysema and chronic bronchitis, and for industrial applications in small-size combustion furnaces and aquaculture. The oxygen enricher of this invention is characterized by being light in weight and compact, producing little noise, and being able to produce oxygen-enriched air having a small temperature difference from the temperature of the atmospheric air and having a oxygen concentration of not more than 50%. Accordingly, the oxygen-enriched air obtained from the oxygen enricher of this invention is especially recommended for use in medical therapy.

Inhalation of oxygen-enriched air having an oxygen concentration of more than 60% is known to cause pneumonic ailments or nervous disorders rather than to perform therapy. It is also known that oxygen-enriched air having a large temperature difference from the temperature of the atmospheric air gives an unpleasant feeling to patients. Evidently, a heavy, bulky and noise-making device is inappropriate.

The oxygen enricher of this invention has incorporated therein the module of this invention and further comprises a fan provided in front of the common feed port of the module, a vacuum pump connected to the second common drawing port of the module, cooling and moisture-removing means, an intake-port for the atmospheric air, an opening for discharging the air, and a housing having these members provided therein.

Incorporation of the module into the oxygen enricher can be achieved not only by setting the module of this invention therein, but also by providing the aforesaid array before the building of the module of this invention in a preselected area in the oxygen enricher. The oxygen enricher of this invention includes those in which the module has been incorporated by any of these methods.

The fan takes the air from the air take-in opening, supplies it to the module and discharges it from the discharge opening.

The vacuum pump reduces the pressure of the passages for the oxygen-enriched air in the module and takes out the oxygen-enriched air out of the oxygen enricher so that concentration is effected with good efficiency through the solid membranes of this invention.

In the oxygen enricher, the gas having a reduced oxygen concentration as a result of going through the module is discharged from the air discharging opening after it has cooled the vacuum pump. Before the oxygen-enriched air from the vacuum pump is taken out of the oxygen enricher, it is cooled with the atmospheric air taken into the oxygen enricher from the air take-in opening and the water is removed therefrom. The cooling and water removing means may, for example, be a hose through which oxygen-enriched air can flow. The cooled oxygen-enriched air is taken out of the oxygen enricher without heat exchange with the hot gas to be discharged which has cooled the vacuum pump.

The fan used in this invention should be capable of supplying the atmospheric air into the module in an amount at least 5 times, preferably at least 10 times, more preferably at least 30 times, the amount of oxygen-enriched air to be drawn off from the module. A suitable example of the vacuum pump is the one which does not permit inclusion of fine particles such as oils because the resulting oxygen-enriched air is used for human inhalation. A preferred vacuum pump is of oilless type with suppressed noise and good durability. The ability of the pump varies greatly depending upon the amount of enriched air, the concentration of oxygen, and the performance of the separating membrane. For example, when it is desired to obtain oxygen-enriched air having an oxygen concentration of at least 35% at 6 liters/min. for therapeutic purposes, and the ratio of the oxygen permeation coefficient to nitrogen permeation coefficient of the solid membrane is 3.5, the pump is required to have such a performance as can secure a flow rate of 6 liters/min. at an absolute pressure of 270 mmHg. For use in therapeutic oxygen enrichers, oilless pumps of the diaphragm type made by Gast Corp. and Thomas Corp. of U.S.A. and Iwai Kabushiki Kaisha of Japan, for example, are used preferably.

The gas to be discharged from the module can be utilized for the cooling of the vacuum pump in operation. Preferably, the cooled gas is discharged out of the oxygen enricher through an air duct having at least one winding portion in order to prevent leakage of the pump noises from the oxygen enricher. It is also preferred to apply a sound absorbing material, etc. to the wall of the housing around the pump.

A heat exchanger such as a hose is used as the cooling and water-separating means. In order to cool the oxygen-enriched air with good efficiency by the atmospheric air to a point near the temperature of the atmospheric air through the heat exchanger it is preferred to provide the heat exchanger immediately near the air take-in opening. Care should be taken so that the surrounding of the heat exchanger is not warmed by the heat of the vacuum pump.

From the standpoint of heat conduction, the heat exchanger is preferably made of a metallic material. A copper material is especially preferred because it also has an antibacterial effect. The heat exchanger may be of any of ordinary types. A preferred type is the one which is compact and permits flowing of water therethrough. Accordingly, a coil-like heat exchanger is preferred. The length of the heat exchanger differs depending upon the amount and temperature of the enriched air. In some case, the length of the coil is desirably more than 1 meter.

The water-separating means serves to separate the water from the enriched air. The simplest means is to introduce water-containing enriched air from a side portion of a cylindrical tube, and separating the air upwardly and the moisture downwardly. To improve the separating efficiency, a packing such as a Raschig ring may be put into the cylindrical tube, and it is also possible to provide an obstacle such as a shelf therein. The water which gathers in the lower portion of the water separator is discharged out of it. The manner of discharging is not particularly restricted. For example, a receiver tray is provided to pool the water therein. Or the water is caused to be absorbed by a material capable of well absorbing water, such as a gauze, and then is evaporated. In the latter case, water can be evaporated efficiently by using the exhaust gas which has been used to cool the pump.

If required, the oxygen enricher may also include a column packed with activated carbon or the like for removing noxious gases such as $NO_x$ and $SO_x$ and offensive odors from the enriched air, or a biofilter for removing bacteria from the enriched air. This is also effective for preventing bacterial contamination in the conduit portion for enriched air when the oxygen enricher is out of operation. The oxygen enricher may also include accessory parts such as alarms for detecting and warning an abnormal condition during the operation, timers, flow meters, manometers, etc.

The following Examples illustrate the present invention more specifically. All parts in these examples are by weight.

EXAMPLE 1

Cyclohexenyl hydroxyperoxide (4.75 parts) was dissolved in 90.25 parts of cyclohexene, and 5.0 parts of poly(4-methylpentene-1) (TPX DX-810, a trademark for a product of Mitsui Petrochemical Industries, Ltd.) to prepare a solvent solution.

The solvent solution was maintained at 25° C., and one drop of the solvent solution was dropped onto the surface of stationary water at 10° C. (liquid support) from an opening having an area of about 2 mm² and spaced about 3 mm above the water surface.

Immediately then, the droplet of the solvent solution spread on the water surface to give a substantially circular solid membrane having its center nearly at the site of dropping. This operation was repeated a number of times to give circular solid membranes. The average membrane area of the resulting solid membranes was 567 cm².

Two solid membranes so formed on the water surface were supported on the same surface of a porous polypropylene film from below the water surface, and were withdrawn from the water (the two solid membranes were in the superimposed state) to obtain a composite film.

The composite film had an oxygen permeation velocity of $2.51 \times 10^{-4}$ cc (STP)/cm²·sec·cmHg. The ratio of the oxygen velocity coefficient to nitrogen permeation velocity (to be referred to as selectivity) of the composite film was 3.5.

The surface tension ($c_1$) of water, the surface tension ($a_1$) of the solvent solution and the interfacial tension ($b_1$) between the water and the solvent solution, which were all measured at 25° C., were 72.0, 17.8, and 8.2 dynes/cm, respectively. The $[c_1-(a_1+b_1)]$ value determined from these measured values (to be referred to as the spreading factor) was 46.0 dynes/cm.

The distribution coefficient of the cyclohexyl hydroxyperoxide (the concentration in cyclohexene/the concentration in water) was 2.6.

These results are summarized in Table 1.

It was ascertained that cyclohexenyl hydroperoxide was not present in the resulting composite film.

The thickness of one membrane was calculated to be 0.08 micron on an average. (One drop weighed 0.075 g on an average, and the amount of the polymer in the liquid droplet was $3.75 \times 10^{-3}$ g, and the specific gravity of the polymer was 0.830.)

EXAMPLES 2 AND 8

Example 1 was repeated except that cyclohexylamine, aniline, α-naphthol, phenol, benzoic acid, cyclohexanone or furfural was used instead of cyclohexenyl hydroxyperoxide. The results are shown in Table 1.

EXAMPLES 9 TO 11

Example 1 was repeated except that poly(4-methylpentene-1) TPX MX-001, TPX MX-002 or TPX MX-004 (the products of Mitsui Petrochemical Industries, Ltd.) was used instead of the poly(4-methylpentene-1) TPX DX-810. The results are shown in Table 1.

EXAMPLE 12

Example 1 was repeated except that a solvent solution obtained by dissolving 5.0 parts of poly[4-methylpentene-1(70)-decene-1 (30)] copolymer (charge ratio 70 moles of 4-methylpentene and 30 moles of decene-1) in a solution of 4.75 parts of cyclohexenone in 90.25 parts of cyclohexene was used instead of the solvent solution used in Example 1. The results are shown in Table 1.

EXAMPLES 13 TO 15

Example 1 was repeated except that a solvent solution obtained by dissolving 5.0 parts of poly(1,2-butadiene), poly(1-butene) or poly(1,4-butadiene) in a solution of 4.75 parts of cyclohexenyl hydroxyperoxide in 90.25 parts of cyclohexene was used instead of the solvent solution used in Example 1. The results are shown in Table 1.

EXAMPLE 16

Example 1 was repeated except that a solvent solution obtained by dissolving 3 parts of polyisoprene in a solution of 3 parts of cyclohexanol in 94 parts of cyclohexene was used instead of the solvent solution used in Example 1. The results are shown in Table 1.

COMPARATIVE EXAMPLE 1

Example 1 was repeated except that a solvent solution consisting of 5.0 parts of poly(4-methylpentene-1) (TPX DX-810) dissolved in 95 parts of cyclohexene was used instead of the solvent solution used in Example 1. The results are shown in Table 1.

It is seen from Table 1 that in this example, the spreading factor was only 16.7 dynes/cm. For this reason, spreading of the liquid droplet on the water surface was poor (average membrane area 202 cm²), and the resulting solid membrane has numerous pores.

COMPARATIVE EXAMPLES 2 AND 3

Example 1 was repeated except that n-octanol or ethanol was used instead of the cyclohexyl hydroxyperoxide used in Example 1.

The results are shown in Table 1.

It is seen from Table 1 that in these Comparative Examples, the spreading factor was within the range of this invention, but the distribution coefficient between cyclohexene and water fell outside the range of this invention. The distribution coefficient was 39.1 for n-octanol, but was nearly 0 for ethanol. This is presumably because the n-octanol has low solubility in water and therefore remains in the membrane even when the cyclohexene solvent has evaporated off, and since the n-octanol has no solubilizing power for poly(4-methylpentene-1), the polymer precipitated and fails to form a membrane. In the case of ethanol, it is presumed that since its solubility in water is high, it dissolves in water immediately after dropping, and it is the same as in the case of using no additive. The membrane obtained by addition of ethanol is much the same in appearance as the membrane obtained by using cyclohexene alone.

TABLE 1

| | | Other compound in the solvent | |
| --- | --- | --- | --- |
| Example | Addition polymer | Name | Distribution Coefficient (Cyclohexene/water) |
| 1 | Poly(4-methyl-pentene-1) (DX-810) | Cyclohexenyl hydroxyperoxide | 2.6 |
| 2 | Poly(4-methyl-pentene-1) | Cyclohexylamine | 3.8 |

TABLE 1-continued

| | | | |
|---|---|---|---|
| 3 | Poly(4-methyl-pentene-1) (DX-810) | Aniline | 2.3 |
| 4 | Poly(4-methyl-pentene-1) (DX-810) | α-Naphthol | 10.1 |
| 5 | Poly(4-methyl-pentene-1) (DX-810) | Phenol | 2.3 |
| 6 | Poly(4-methyl-pentene-1) (DX-810) | Benzoic acid | 6.4 |
| 7 | Poly(4-methyl-pentene-1) (DX-810) | Cyclohexanone | 1.6 |
| 8 | Poly(4-methyl-pentene-1) (DX-810) | Furfural | 0.6 |
| 9 | Poly(4-methyl-pentene-1) (MX-001) | Cyclohexenyl hydroxyperoxide | 2.6 |
| 10 | Poly(4-methyl-pentene-1) (MX-002) | Cyclohexenyl hydroxyperoxide | 2.6 |
| 11 | Poly(4-methyl-pentene-1) (MX-004) | Cyclohexenyl hydroxyperoxide | 2.6 |
| 12 | Poly[4-methyl-pentene(70)-decene-1(30)] copolymer | Cyclohexenone | 1.8 |
| 13 | Poly(1,2-butadiene) | Cyclohexenyl hydroxyperoxide | 2.6 |
| 14 | Poly(1-butene) | Cyclohexenyl hydroxyperoxide | 2.6 |
| 15 | Poly(1,4-butadiene) | Cyclohexenyl hydroxyperoxide | 2.6 |
| 16 | Polyisoprene | Cyclohexanol | 2.2 |
| Comp. Ex. 1 | Poly(4-methyl-pentene-1) (DX-810) | None | — |
| Comp. Ex. 2 | Poly(4-methyl-pentene-1) (DX-810) | Octanol | 39.1 |
| Comp. Ex. 3 | Poly(4-methyl-pentene-1) (DX-810) | Ethanol | —0 |

Measurement of surface and interfacial tensions (dyne/cm)

| Example | Surface tension of the solvent solution | Interfacial tension between the solvent solution and water | Spreading factor $[c_1 - (a_1 + b_1)]$ |
|---|---|---|---|
| 1 | 17.8 | 8.2 | 46.0 |
| 2 | 21.8 | 7.0 | 43.2 |
| 3 | 18.9 | 6.5 | 46.8 |
| 4 | 18.9 | 13.7 | 39.4 |
| 5 | 21.9 | 16.7 | 33.4 |
| 6 | 22.0 | 15.2 | 34.8 |
| 7 | 19.5 | 18.0 | 34.5 |
| 8 | 16.0 | 19.5 | 36.5 |
| 9 | 18.0 | 7.6 | 46.4 |
| 10 | 19.4 | 8.0 | 44.6 |
| 11 | 17.5 | 7.9 | 46.6 |
| 12 | 24.7 | 15.2 | 32.1 |
| 13 | 22.7 | 3.1 | 46.2 |
| 14 | 22.5 | 7.2 | 42.3 |
| 15 | 22.8 | 10.8 | 38.4 |
| 16 | 22.7 | 11.6 | 37.7 |
| Comp. Ex. 1 | 22.7 | 32.6 | 16.7 |
| Comp. Ex. 2 | 22.2 | 11.4 | 38.4 |
| Comp. Ex. 3 | 18.5 | 7.6 | 45.9 |

Properties of the solid membrane

| Example | area (cm²) | permeating velocity [cc(STP)/cm².sec.cmHg] | Selectivity (O₂/N₂) |
|---|---|---|---|
| 1 | 567 | $2.51 \times 10^{-4}$ | 3.5 |
| 2 | 548 | $2.80 \times 10^{-4}$ | 3.3 |
| 3 | 324 | $3.42 \times 10^{-4}$ | 2.8 |
| 4 | 403 | $3.89 \times 10^{-4}$ | 2.8 |
| 5 | 369 | $3.27 \times 10^{-4}$ | 2.9 |
| 6 | 384 | $3.06 \times 10^{-4}$ | 3.0 |
| 7 | 333 | $2.81 \times 10^{-4}$ | 3.2 |
| 8 | 363 | $4.05 \times 10^{-4}$ | 2.7 |
| 9 | 527 | $2.29 \times 10^{-4}$ | 3.7 |
| 10 | 518 | $2.23 \times 10^{-4}$ | 3.7 |
| 11 | 590 | $2.30 \times 10^{-4}$ | 3.5 |
| 12 | 340 | $4.52 \times 10^{-4}$ | 2.3 |
| 13 | 326 | $2.58 \times 10^{-4}$ | 2.5 |
| 14 | 342 | $4.63 \times 10^{-4}$ | 2.7 |
| 15 | 414 | $3.93 \times 10^{-4}$ | 2.5 |
| 16 | 308 | $2.21 \times 10^{-4}$ | 2.3 |
| Comp. Ex. 1 | 202 | Because of numerous pores, a homogeneous membrane could not be obtained. | |
| Comp. Ex. 2 | 514 | The polymer precipitated and failed to give a membrane. | |
| Comp. Ex. 3 | 323 | Because of numerous pores, a homogeneous membrane could not be obtained. | |

EXAMPLE 17

A solution was prepared by dissolving 1.5 parts of poly(4-methylpentene-1) (TPX DX-810, a product of Mitsui Petrochemical Industries, Ltd.) in a solution of 3 parts of cyclohexenyl hydroxyperoxide in 95.5 parts of trichloroethylene.

The surface tension ($c_1$) of water, the surface tension ($a_1$) of the solvent solution, and the interfacial tension ($b_1$) between the water and the solvent solution, which were measured at 25° C., were 72.0, 21.0 and 15.4 dynes/cm, respectively. The $[c_1-(a_1+b_1)]$ value calculated from the measured values was 35.6.

The distribution coefficient of the cyclohexenyl hydroxyperoxide (the concentration in trichloroethylene/the concentration in water) was 3.1.

The solvent solution was maintained at 70° C., and one drop of it was gently added to the water surface at 30° C. The resulting solid membrane had an average membrane area of 280 cm² and a thickness of 0.064 micron.

A laminated assembly of two such solid membranes showed an oxygen permeation velocity of $2.93 \times 10^{-4}$ cc (STP)/cm²·sec·cmHg, and a selectivity of 3.3.

COMPARATIVE EXAMPLE 4

Example 17 was repeated except that a solvent solution prepared by dissolving 1.5 parts of poly(4-methylpentene-1) (TPX DX-810) in 98.5 parts of trichloroethylene was used instead of the solvent solution used in Example 17. The resulting solid membrane had an average membrane area of 50 cm². A laminated assembly of two such solid films showed an oxygen permeation velocity of $3.9 \times 10^{-3}$ cc (STP)/cm²·sec·cmHg and a selectivity of 1.1.

The surface tension ($a_1$) of the solvent solution and the interfacial tension ($b_1$) between the water and the solvent solution were 24.0 and 26.2 dynes/cm, respectively. The $[c_1-(a_1+b_1)]$ value calculated from these measured values was 21.8.

EXAMPLE 18

A solvent solution was prepared by dissolving 5 paerts of poly(4-methylpentene-1) (TPX DX-810) in a solution of 95 parts of cyclohexene in 5 parts of cyclohexenone.

The solvent solution was maintained at 40° C., and one drop of it was added dropwise to the surface of water at 10° C. as a stationary liquid support from an opening with an area of about 1 mm² located about 3 mm above the water surface. The average membrane thickness was 450 cm², and the thickness of one membrane was calculated to be 0.060 micron on an average.

A composite film composed of two such solid films supported on a porous polypropylene film showed an oxygen permeation velocity of $5.5 \times 10^{-4}$ cc (STP)/cm²·sec·cmHg and a selectivity of 3.3.

EXAMPLES 19 TO 26

Example 18 was repeated except that each of the additives shown in Table 2 was used instead of cyclohexenone. The area and thickness of the resulting membrane and the properties of a laminated assembly of two such solid membranes are shown in Table 2.

TABLE 2

| Example | Additive | Membrane area (cm²) | Membrane thickness (microns) | Oxygen permeation velocity [cc(STP)/ cm².sec.cmHg] | Selectivity |
|---|---|---|---|---|---|
| 19 | Ethyl glycol monophenyl ether | 390 | 0.070 | $4.5 \times 10^{-4}$ | 3.1 |
| 20 | Anisyl alcohol | 420 | 0.065 | $5.0 \times 10^{-4}$ | 3.2 |
| 21 | β-phenethyl alcohol | 380 | 0.071 | $4.2 \times 10^{-4}$ | 3.1 |
| 22 | 2,6-Xylenol | 350 | 0.077 | $4.5 \times 10^{-4}$ | 3.0 |
| 23 | Isophorone | 390 | 0.070 | $4.8 \times 10^{-4}$ | 3.0 |
| 24 | Acetophenone | 300 | 0.090 | $2.2 \times 10^{-4}$ | 3.0 |
| 25 | Anisaldehyde | 360 | 0.075 | $4.6 \times 10^{-4}$ | 3.1 |
| 26 | Hydroxy-citronellal | 380 | 0.071 | $4.0 \times 10^{-4}$ | 3.2 |

EXAMPLES 27 TO 33

Example 18 was repeated except that cyclohexenol was used instead of cyclohexanone and each of the addition polymers shown in Table 3 was used instead of poly(4-methylpentene-1).

The average membrane areas and thicknesses of the resulting solid membranes are shown in Table 3. Table 3 also shows, for purposes of comparison, the average membrane areas of solid membranes obtained in the same way as above except that cyclohexene alone was used as the solvent.

TABLE 3

| Example | Addition polymer | Membrane area (cm²) (*) | Membrane thickness (microns) |
|---|---|---|---|
| 27 | Poly(hexene-1) | 550 (230) | 0.051 |
| 28 | Poly(pentene-1) | 530 (220) | 0.057 |
| 29 | Polystyrene | 620 (410) | 0.048 |
| 30 | Poly(1,4-butadiene) | 480 (140) | 0.063 |
| 31 | Poly(decene-1) | 720 (310) | 0.042 |
| 32 | Poly[4-methylpentene-1 (70)-hexene-1 (30)] copolymer (**) | 580 (240) | 0.060 |
| 33 | Poly[4-methylpentene-1 (80)-decene-1 (20)] copolymer (**) | 610 (210) | 0.096 |

(*) The parenthesized figures show the membrane areas for comparison.
(**) The figures in the smaller parentheses show the mole ratios of the charged monomers.

EXAMPLE 34

A solvent solution was prepared from 85 parts of cyclohexene, 5 parts of cyclohexenone, 5 parts of cyclohexenol and 5 parts of poly(4-methylpentene-1) (DX-810). The solvent solution was maintained at 45° C., and one drop of it was dropped onto the surface of water at 10° C. in the same way as in Example 18. In the same way as in Example 18, two solid membranes (average thickness about 0.055 microns) were supported on a porous polypropylene film (Celgard, a trademark for a product of Celanese Corporation), and the resulting composite film was placed on a glass plate and heat-treated for 4 hours at each of the temperatures shown in Table 4.

The properties of the composite film are also shown in Table 4.

A weight (1 g) was placed gently on the solid membrane surface of the heat-treated composite film, and then pulled up. The oxygen permeation properties of the area on which the weight has been placed were determined. The results are also shown in Table 4.

TABLE 4

| Run No. | Heat-treatment temperature (°C.) | Permeating properties after heat-treatment | | Permeating properties after placing the weight | |
|---|---|---|---|---|---|
| | | Oxygen permeating velocity [cc(STP)/cm.sec.cmHg] | Selectivity | Oxygen permeating velocity [cc(STP)/cm.sec.cmHg] | Selectivity |
| 1 | None | $6.9 \times 10^{-4}$ | 3.0 | $>1 \times 10^{-2}$ | 1.0 |
| 2 | 20 | $6.8 \times 10^{-4}$ | 2.9 | $>1 \times 10^{-2}$ | 1.0 |
| 3 | 40 | $6.0 \times 10^{-4}$ | 3.0 | $>1 \times 10^{-2}$ | 1.0 |
| 4 | 60 | $3.7 \times 10^{-4}$ | 3.1 | $3.9 \times 10^{-4}$ | 3.0 |
| 5 | 80 | $3.1 \times 10^{-4}$ | 3.4 | $3.1 \times 10^{-4}$ | 3.4 |
| 6 | 100 | $2.7 \times 10^{-4}$ | 3.4 | $2.6 \times 10^{-4}$ | 3.5 |
| 7 | 120 | $3.0 \times 10^{-4}$ | 3.3 | $2.8 \times 10^{-4}$ | 3.5 |
| 8(*) | None | $4.5 \times 10^{-4}$ | 3.5 | $>1 \times 10^{-2}$ | 1.1 |
| 9(*) | 80 | $2.0 \times 10^{-4}$ | 3.9 | $2.1 \times 10^{-4}$ | 3.9 |

(*)In Runs Nos. 8 and 9, the addition polymer was 4-methylpentene-1 (MX-002), and the heat-treatment in Run No. 9 was performed at 80° C. for 4 hours.

The results in Table 4 demonstrate that heat-treatment under suitable conditions gives solid membranes of this invention which have resistance to rupture.

EXAMPLES 35 TO 37

Example 50 was repeated except that each of the addition polymers in Table 5 was used, and the heat-treatment was performed at 80° C. for 4 hours. The tesults are shown in Table 5.

TABLE 5

| Example | Polymer (membrane thickness) | Permeating properties before heat-treatment | | Permeating properties after heat-treatment | |
|---|---|---|---|---|---|
| | | Oxygen permeating velocity [cc(STP)/cm. sec.cmHg] | Selectivity | Oxygen permeating velocity [cc(STP)/cm. sec.cmHg] | Selectivity |
| 35 | Polystyrene (0.13 micron) | $3.6 \times 10^{-5}$ | 1.7 | $2.7 \times 10^{-05}$ | 1.9 |
| 36 | Poly(1,4-butadiene (0.09 micron) | $7.0 \times 10^{-4}$ | 2.6 | $3.1 \times 10^{-4}$ | 3.0 |
| 37 | Poly(4-methylhexene) (0.06 micron) | $6.1 \times 10^{-4}$ | 3.1 | $2.9 \times 10^{-4}$ | 3.3 |

EXAMPLES 38 TO 44

In each run, a solvent solution was prepared by dissolving 5 parts (5.26 parts in Examples 41 to 44) of each of the addition polymers shown in Table 6 in 100 arts of a solvent composed of cyclohexene and cyclohexenyl hydroxyperoxide. The solvent solution was maintained at 40° C., and one drop of its was dropped onto the surface of water at 10° C. in the same way as in Example 1.

Two solid membranes obtained were supported on a porous polypropylene film in the same way as in Example 1, and the resulting composite film was then heat-treated at 90° C. for 4 hours. The properties of the composite film are also shown in Table 6.

TABLE 6

| Example | Content of cyclohexenyl hydroperoxide in the solvent (wt. %) | Polymer | Average membrane area (cm²) | Oxygen permeating velocity [cc(STP)/ cm².sec.cmHg] | Selectivity |
|---|---|---|---|---|---|
| 38 | 4.7 | Poly(4-methylpentene-1) (DX-810) | 552 | $1.51 \times 10^{-4}$ | 3.28 |
| 39 | 12.2 | Poly(4-methylpentene-1) (DX-810) | 591 | $1.68 \times 10^{-4}$ | 3.05 |
| 40 | 3.0 | Poly(4-methylpentene-1) (DX-810) | 450 | $1.62 \times 10^{-4}$ | 3.12 |
| 41 | 3.0 | Poly(4-methylpentene-1) (MX-001) | 550 | $1.21 \times 10^{-4}$ | 4.03 |
| 42 | 3.0 | Poly(4-methylpentene-1) (MX-002) | 548 | $1.20 \times 10^{-4}$ | 4.14 |
| 43 | 3.0 | Poly(4-methylpentene-1) (MX-004) | 548 | $1.20 \times 10^{-4}$ | 3.97 |
| 44 | 3.0 | Poly(1,2-butadiene) | 470 | $1.55 \times 10^{-5}$ | 2.98 |

EXAMPLES 45 TO 53

(1) 600 Parts of cyclohexene distilled at amtospheric pressure was oxidized with oxygen or air under the various conditions shown in Table 7, and a solvent containing cyclohexenyl hydroxyperoxide was produced. The refractive index, measured by the Abbe's refractometer, of the resulting solvent is also shown in Table 7. The solvent of Run No. 5 in Table 7 was obtained by diluting the solvent of Run No. 3 to 2.5 times its volume with cyclohexene.

TABLE 7

| Run No. | Molecular oxygen | Reaction temperature (°C.) | Reaction (hours) | Stirring | Refractive index of the solvent ($n_\alpha^{15}$) |
|---|---|---|---|---|---|
| 1 | Oxygen | 50 | 33 | Yes | 1.4500 |
| 2 | Oxygen | 83 | 61 | Yes | 1.4538 |
| 3 | Oxygen | 50 | 47 | Yes | 1.4527 |
| 4 | Air | 30 | 72 | No | 1.4494 |
| 5 | — | — | — | — | 1.4500 |
| 6 | Air | 30 | 72 | No | 1.4494 |

(2) Five parts of each of the addition polymers shown in Table 8 was dissolved in 95 parts of the solvent obtained as in (1), and a solid membrane was prepared in the same way as in Example 38 using the solvent solution.

The properties of the resulting composite film (having two solid membranes supported on a porous support; heat-treated at 90° C. for 4 hours) are also shown in Table 8.

TABLE 8

| Example | Solvent (Run No.) | Addition polymer | Average membrane area (cm²) | Properties of the membrane | N₂ permeating velocity [cc(STP)/cm². sec.cmHg] | O₂ permeating velocity [cc(STP)/cm². sec.cmHg] | Selectivity |
|---|---|---|---|---|---|---|---|
| 45 | 1 | Poly(4-methylpentene-1) (DX-810) | 552 | tough and homogeneous | $0.46 \times 10^{-4}$ | $1.51 \times 10^{-4}$ | 3.28 |
| 46 | 2 | Poly(4-methylpentene-1) (DX-810) | 620 | cloudy at the surface | $0.95 \times 10^{-4}$ | $2.10 \times 10^{-4}$ | 2.21 |
| 47 | 3 | Poly(4-methylpentene-1) (DX-810) | 591 | relatively tough and homogeneous | $0.55 \times 10^{-4}$ | $1.68 \times 10^{-4}$ | 3.05 |
| 48 | 4 | Poly(4-methylpentene-1) (DX-810) | 450 | tough and homogeneous | $0.52 \times 10^{-4}$ | $1.62 \times 10^{-4}$ | 3.12 |

TABLE 8-continued

| Example | Solvent (Run No.) | Addition polymer | Average membrane area (cm$^2$) | Properties of the membrane | N$_2$ permeating velocity [cc(STP)/cm$^2$·sec·cmHg] | O$_2$ permeating velocity [cc(STP)/cm$^2$·sec·cmHg] | Selectivity |
| --- | --- | --- | --- | --- | --- | --- | --- |
| 49 | 5 | Poly(4-methylpentene-1) (DX-810) | 544 | tough and strong | $0.44 \times 10^{-4}$ | $1.48 \times 10^{-4}$ | 3.36 |
| 50 | 6 | Poly(4-methylpentene-1) (MX-001) | 550 | tenacious and homogeneous | $0.30 \times 10^{-4}$ | $1.21 \times 10^{-4}$ | 4.03 |
| 51 | 6 | Poly(4-methylpentene-1) (MX-002) | 548 | tenacious and homogeneous | $0.29 \times 10^{-4}$ | $1.20 \times 10^{-4}$ | 4.14 |
| 52 | 6 | Poly(4-methylpentene-1) (MX-004) | 548 | tenacious and homogeneous | $0.30 \times 10^{-4}$ | $1.20 \times 10^{-4}$ | 3.97 |
| 53 | 5 | Poly(1,2-butadiene) (RB-810) | 470 | tenacious and homogeneous | $0.52 \times 10^{-5}$ | $1.55 \times 10^{-5}$ | 2.98 |

EXAMPLE 54

A solvent solution was prepared which consisted of 92 parts of cyclohexene, 3 parts of cyclohexenyl hydroxyperoxide and 5 parts of poly(4-methylpentene-1) (DX-810).

Figure 2:
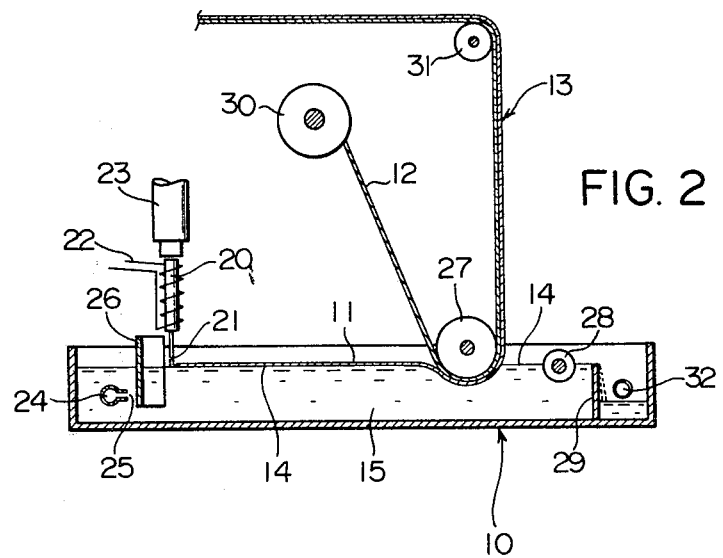
FIG. 2 is a schematic cross-sectional view taken on line A—A' of FIG. 1 further showing a porous sheet-like material and other members required for its motion.

A solid membrane of this invention was continuously produced from the solvent solution by using an apparatus of the type shown in FIGS. 1 and 2.

The solvent solution was maintained at 25° C. in reservoir 20, and continuously fed at a rate of 61 cc/hr to the water surface 14 from feed port 21 in contact with the water surface. Water 15 in tank 10 was maintained at 5° C. Water was fed through water supplying pipe 24, overflowed beyond dam 29, and while discharged from water discharge port 32.

A porous polypropylene film 12 having a thickness of 25 microns and a width of 30 cm was fed from feed roller 30 into the water via rotary shaft 27 at a rate of 2 meters/min., and then withdrawn via guide roller 31.

Thus, a solid membrane 13 of the invention supported on the porous polypropylene film was continuously produced. The average membrane thickness of the solid membrane was 0.075 micron, and the composite film had an oxygen permeating velocity of $8.3 \times 10^{-4}$ cc (STP)/cm·sec·cmHg and a selectivity of 2.6.

COMPARATIVE EXAMPLES 5 AND 6

Example 54 was repeated except that the position of the feed opening 21 was raised to a point 10 mm above the water surface (Comparative Example 5), or it was submerged in the water to a depth of 10 mm from the water surface (Comparative Example 6).

The results are shown Table 9 together with the data of Example 54.

TABLE 9

| Run | Position of the feed opening | State of membrane formation | Selectivity (n=3) |
| --- | --- | --- | --- |
| Comparative Example 5 | 10 mm above water surface | Wavy. The membrane width occasionally reached 10 to 20 cm and was not stable | 1.0 1.0 1.3 |
| Comparative Example 6 | 10 mm below water surface | Wavy. The membrane width occasionally reached about 15 to 20 cm and was not stable | 1.0 1.2 1.2 |
| Example 54 | Contacting water | A stable membrane having a uniform width of more | 2.5 2.7 |

TABLE 9-continued

| Run | Position of the feed opening | State of membrane formation | Selectivity (n=3) |
| --- | --- | --- | --- |
| | surface | than 35–40 cm was formed | 2.6 |

EXAMPLE 55

In order to support two solid membranes on a porous membrane using the apparatus shown in FIGS. 1 and 2, a loop (length 2 m) of the porous film (thickness 25 microns, width 30 cm) was set between guide roller 31 and rotatable shaft 27, and the loop was rotated between the roller and the shaft. Otherwise, the same conditions as in Example 54 were used, and a laminated assembly of two solid films supported on the porous membrane was produced.

An about 1.8 m length was taken from the resulting composite film excepting the joint portion, and at any 10 sites in the longitudinal and widthwise directions, a membrane sample having a size of 10 cm × 10 cm was cut out, and the oxygen permeating properties of the cut samples were measured. It was found that the oxygen permeating velocities of the samples were 1.3 to $1.7 \times 10^{-4}$ cc (STP)/cm$^2$·sec·cmHg and their selectivities were 3.8 to 4.0, showing little variations. The selectivity of the composite film was better than in the case of the batchwise operation in which one drop of the solvent solution was dropped onto the liquid support.

The membrane thickness was determined to be 0.12 to 0.15 micron by calculating the weight loss of the solid membrane not carried on the porous film after wiping it off.

EXAMPLE 56

In the apparatus shown in FIGS. 1 and 2, a heat-treating column having a length of 1 meter was provided between rotatable shaft 27 and guide roller 31.

Using the resulting apparatus, Example 54 was repeated except that the temperature of the heat-treating column was set at 165° C.

The solid membrane supported on the porous film could be wound up on a drum having a diameter of 10 cm.

EXAMPLES 57 TO 59

Example 55 was repeated except that each of the various addition polymers shown in Table 10 was used instead of the poly(4-methylpentene-1) used in Example 55. The results are shown in Table 10.

TABLE 10

| Example | Addition polymer | Selectivity |
| --- | --- | --- |
| 57 | Poly(4-methylpentene-1)(MX002) | 4.1 |
| 58 | Poly(hexene-1) | 3.2 |
| 59 | Poly(1,4-butadiene) | 2.9 |

EXAMPLE 60

(1) On both surfaces of an aluminum plate having a size of 250 mm×500 mm×1 mm (thickness) were laminated a polypropylene net (thickness 500 microns, mesh opening size 14 mesh) and a polyethylene terephthalate nonwoven fabric (thickness 230 microns, basis weight 180 g/m$^2$) having nearly the same size as the aluminum plate, in this order, to form a basic member.

Figure 3:
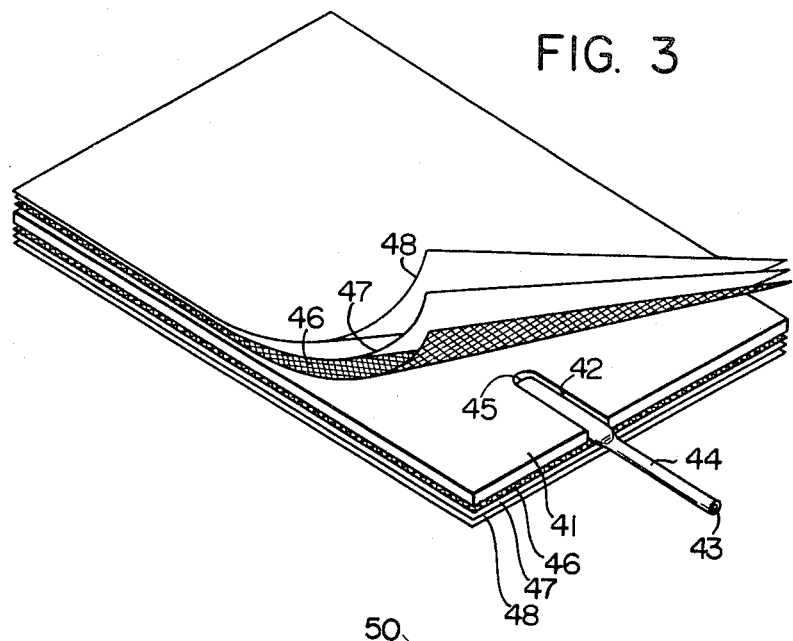

FIG. 3 of the accompanying drawings show schematic perspective view illustrating the structure of this member.

A cut 42 having a width of 6 mm and a length of 40 mm was provided in one 250 mm-long side of the aluminum plate 41. To the cut 42 was fixed a drawing tube 44 for giving a gas drawing port 43 for drawing off a concentrated gas.

The drawing pipe 44 was built by providing a cylindrical metallic tube having a thickness of 0.3 mm, an outside diameter of 3.3 mm and a length of 75 mm, and collapsing a 50 mm-long portion of the tube from one end thereof until that portion had a thickness of 1.2 mm (the collapsed portion had a width of 4.5 mm). The collapsed portion was inserted into the cut 42 of the aluminum plate 41 as shown in FIG. 3, and an epoxy resin was filled in the space formed between the aluminum plate and the drawing tube to fix the drawing tube to the aluminum plate. At this time, the end 45 of the collapsed portion of the drawing tube 44 was positioned so that it formed a clearance of more than about 5 mm from the deepest part of the cut. By employing this construction, a gas concentrated by the solid membrane is collected by the drawing tube from the end 45 through this clearance, and is drawn off from the drawing port 43.

The net 46, the nonwoven fabric 47 and the solid membrane 48 of this invention were laminated as shown in FIG. 3 to both surfaces of the aluminum plate 41 having the drawing tube 44 fixed thereto. The aluminum plate, the net, the nonwoven fabric and solid membrane were fixed at their peripheral edge portion by an adhesive applied in a width of 15 mm so as to prevent air leakage from the peripheral edge.

The basic member for gas concentration showed a pressure drop of less than 0.6 mmHg per cm.

The solid membrane used was a composite film composed of two very thin poly(4-methylpentene-1) membranes (total average thickness 0.15 micron; selectivity =3.8) supported on a porous polypropylene film (thickness 25 microns, maximum pore diameter 0.2 micron) which was produced continuously by the process of this invention. In lamination, the porous sheet side of the composite film was contacted with the nonwoven fabric.

(2) Fourteen members produced as in (1) above were aligned by using rubber spacers having a thickness of 3 mm and a width of 10 mm between the members at both edges of the longer sides so that the drawing ports 43 were positioned in the same direction. A separately built member consisting of an aluminum plate and laminated to one surface thereof, the aforesaid net, nonwoven fabric and solid membrane (i.e., the other side was an aluminum surface) was superimposed on each of the outermost members of the resulting array of the 14 members so that the aluminum plate surface faced outwardly.

Drawing ports from the individual members of the array were connected to one assembling tube, and the entire structure was placed in a box.

FIG. 4 of the accompanying drawings shows a schematic perspective view of the module of this invention in which the array 51 was placed in the box 50. In FIG. 4, the reference numeral 52 represents the assembling tube connected to the first drawing ports 44 of the individual members, and the reference numeral 53 represents a second drawing port. The reference numeral 54 represents a common feed port for feeding a gas to be concentrated to the members, and 55, a third common drawing port for drawing the remaining gas formed as a results of concentration. The arrow shows the flow of the gas.

A gas fed from the common feed port in the direction of arrow (a) passed through the individual members of the array 51, and was withdrawn as the remaining gas from the third common drawing port 55. In other words, the fed gas was concentrated during passage through the members, and the concentrated gas was collected by the assembling tube 52 through the first drawing ports 44, and drawn off from the second common drawing port 53.

Oxygen-enriched air was produced from the air using the module constructed as above. The second common drawing port 53 was connected to a vacuum pump (not shown), and while reducing the pressure, air was fed from the common feed opening port 54 at a rate of 0.3 m$^3$/min. Oxygen-enriched air having an oxygen content of 41.7% by volume was obtained at a rate of 7 liters/min. from the vacuum pump.

COMPARATIVE EXAMPLE 7

Members consisting of the aluminum plate, the polyethylene terephthalate nonwoven fabric and the composite film having an ultrathin membrane of poly(4-methylpentene-1) supported on the porous polypropylene membrane were produced in the same way as in Example 60 except that the polypropylene net was not used.

The members showed a pressure drop of 9.4 mmHg per cm. A module was built in the same way as in Example 60 using these members. Air was separated by using the module. When the module was operated while maintaining the pressure of the assembling tube 52 at 190 mmHg ab., oxygen-enriched air having an oxygen content of 26.7% by volume was obtained at a rate of 2.9 liters/min.

COMPARATIVE EXAMPLE 8

When in the module of Example 60, air was fed from the third common drawing port 55 at the same feed rate as in Example 60 and the remaining air was drawn off from the feed port 54, oxygen-enriched air having an oxygen content of 41.2% by volume was obtained at a rate of 7 liters/min. when the pressure in the assembling tube 52 was 160 mmHg.

When the amount of air fed was changed to 70 liters/min., oxygen-enriched air having an oxygen content of 40.9% by volume was obtained by the method of Example 60, and oxygen-enriched air having an oxygen content of 40.2% by volume was obtained by the method of the present Comparative Example. Furthermore, when the amount of air fed was further decreased to 35 liters/min. an oxygen content of 39.6% by volume was achieved by the method of Example 60, but an oxygen content of only 38.6% by volume was achieved by the method of this Comparative Example.

EXAMPLE 61

An oxygen enricher was built by incorporating the module shown in Example 60 (see FIGS. 3 and 4).

Figure 5:
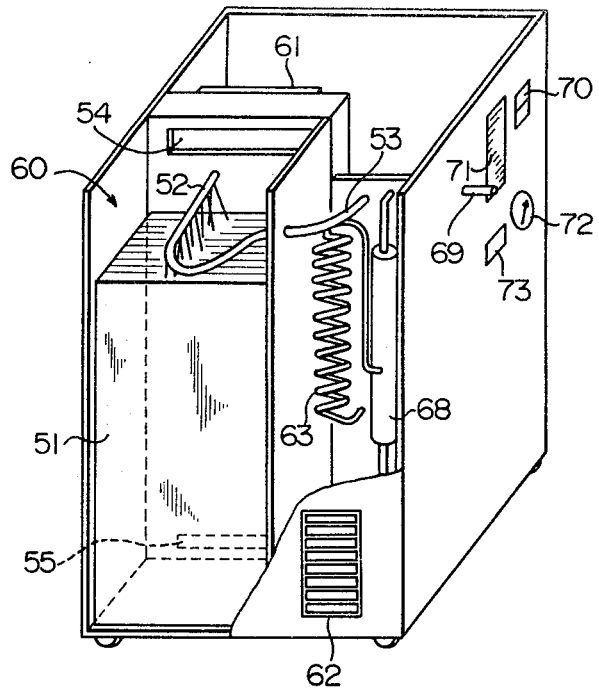
Figure 6:
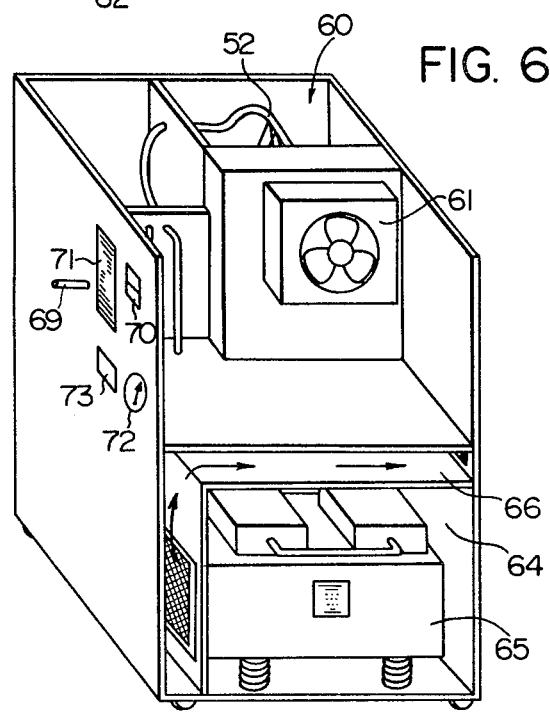

FIGS. 5 and 6 are schematic perspective views of the oxygen enricher of this invention. In these figures, the top and that side surface which appears in front on the sheet surface of these drawings are removed. FIG. 6 shows the same oxygen enricher as in FIG. 5 except that the rear side and the front side in FIG. 5 are reversed.

In FIGS. 5 and 6, the reference numeral 51 represents an array of a plurality of laminated members including the solid membranes of this invention, and 52, an assembling tube connected to the oxygen-enriched air drawing ports of the individual members. The reference numeral 60 represents a module section having the array 51 therein with an air feed port 54 and a discharge port 55 for the remaining gas.

The atmospheric air taken into the oxygen enricher from the air take-in port 62 by the rotation of fan 61 rose in contact with a cooler 63 through which the oxygen-enriched air was passed, and went past the fan 61. Then, it was introduced into the module from air feed port 54 of the module 60 and passed through the array 51. Then, it left the module from the exhaust port 55 of the module (see FIG. 5). Then, it entered a pump chamber 64 to cool a pump 65, and without heat exchange with oxygen-enriched air, was discharged out of the oxygen enricher via a discharge path. The discharge path 66 was independent so that it was kept from contact with electrical instruments (not shown in FIG. 6).

On the other hand, by reducing the pressure of the inside of the individual members of the array 51 by a vacuum pump 65, oxygen-enriched air formed within the individual members was gathered by assembling tube 52, and via the vacuum pump 65, was cooled by flowing through cooling tube 63. Then, water was separated from the oxygen-enriched air by water separator 68, and as desired passed through an activated carbon layer or bacteria filter. Finally, the oxygen enriched air was taken out of the oxygen enricher from a drawing port 69.

The reference numerals 70, 71, 72 and 73 respectively represent a switch button for electric power, a flow meter, a pressure gauge and a timer.

The oxygen enricher had a width of 330 mm, a length of 380 mm, a height of 700 mm (the side having the air drawing port 69 was regarded as the front surface), and a weight of 40 kg. When this oxygen enricher was operated indoors at 15.0° C., oxygen-enriched air having an oxygen concentration of 41.7% was obtained at a rate of 7 liters/min. The temperature of oxygen-enriched air at an absolute pressure of 160 mmHg was 15.4° C. which was nearly the same as the temperature of the room.

The noise during the operation was 43 horn at a place 1 meter away from the oxygen enricher.

For comparison, an oxygen enricher was built by using the module obtained in Comparative Example 5 which did not contain a polypropylene net. When this oxygen enricher was operated indoors at 15.0° C., oxygen enriched air having an oxygen concentration of 26.7% was obtained at a rate of 2.9 liters/min.

What we claim is:

1. A process for producing an ultrathin solid membrane, which comprises dissolving an addition polymer derived from at least one monomer having from 2 to 20 carbon atoms and selected from the group consisting of ethylenically unsaturated hydrocarbon monomers and conjugated unsaturated hydrocarbon monomers in a solvent composed mainly of volatile, substantially water-immiscible organic liquid medium capable of dissolving the addition polymer and being selected from the group consisting of a hydrocarbon and a halogenated hydrocarbon, said solvent containing 0.1 to 15% by weight of another organic compound selected from the group consisting of alicyclic alcohols, aromatic alcohols, ketones, aldehydes, carboxylic acids, peroxides, and mixtures thereof, said organic compound having a distribution coefficient k, which is the ratio of the concentration of the other organic compound in the organic liquid medium to that in water, of from 0.5 to 35, and said solvent meeting the following equation $$c_1 - (a_1 + b_1) \geq 25$$

wherein $c_1$ is the surface tension (dynes/cm) of water, $a_1$ is the surface tension (dynes/cm) of the solution of the addition polymer in the solvent, and $b_1$ is the interfacial tension (dynes/cm) between the solvent solution and water, and thereafter allowing the solvent solution of the addition polymer to spread spontaneously on the surface of a liquid support consisting substantially of water whereby the solvent in the solvent solution is removed to an amount sufficient to form a solid membrane on the surface of the liquid support.

2. The process of claim 1 wherein the solvent meets the following equation $$c_1 - (a_1 + b_1) \geq 35$$

wherein $a_1$, $b_1$, and $c_1$ are as defined in claim 1.

3. The process of claim 1 wherein the other organic compound has a distribution coefficient k of 1.0 to 25.

4. The process of claim 1 wherein the hydrocarbon or halogenated hydrocarbon is an alicyclic or aromatic compound.

5. The process of claim 1 wherein the organic liquid medium is selected from the group consisting of cyclohexene, cyclohexane, trichloroethylene, trichloroethane, tetrachloroethane, trichloropropane and the mixtures thereof.

6. The process of claim 1 wherein the other organic compound is selected from the group consisting of cyclohexenol, cyclohexanol, phenol, cyclohexenone, cyclohexylamine, aniline, furfural, benzoic acid, cyclohexenyl hydroxyperoxide, and the mixtures thereof.

7. The process of claim 1 wherein said ethylenically unsaturated hydrocarbon monomer or the conjugated unsaturated hydrocarbon monomer is an aliphatic or cycloaliphatic compound having 2 to 20 carbon atoms.

8. The process of claim 7 wherein the ethylenically unsaturated hydrocarbon monomer is ethylene, propylene, butene, isobutene, pentene, methylpentene, hexene, methylhexene, heptene, cyclohexylpentene, styrene, α-methylstyrene or a mixture of these.

9. The process of claim 7 wherein the conjugated unsaturated hydrocarbon monomer is butadiene, isoprene, cyclooctadiene or a mixture of these.

10. The process of claim 1 wherein the addition polymer is polyethylene, polypropylene, polybutene, polyisobutene, polypentene, polymethylpentene, polyhexene, polymethylhexene, polyheptene, polycyclohexylpentene, polystyrene, poly(α-methylstyrene), poly(1,4-butadiene), poly(1,2-butadiene), polyisoprene or polycyclooctadiene.

11. The process of claim 1 wherein the solvent solution contains about 0.5 to about 15% by weight of the addition polymer based on the solvent solution.

12. A process for continuously producing an ultrathin solid membrane, which comprises dissolving an addition polymer derived from at least one monomer having from 2 to 20 carbon atoms and selected from the group consisting of ethylenically unsaturated hydrocarbon monomers and conjugated unsaturated hydrocarbon monomers in a solvent composed mainly of a volatile, substantially water-immiscible organic liquid medium which is a hydrocarbon or halogenated hydrocarbon and which is capable of dissolving the addition polymer, said solvent containing from 0.1 to 15% by weight of another organic compound selected from the group consisting of alicyclic alcohols, aromatic alcohols, ketones, aldehydes, carboxylic acids, peroxides, and mixtures thereof, said organic compound having a distribution coefficient k, which is the ratio of the concentration of the other organic solvent in the organic liquid medium to that in water, of from 0.5 to 35, and said solvent meeting the following equation $$c_1 - (a_1 + b_1) \geqq 25$$

wherein $c_1$ is the surface tension (dynes/cm) of water, $a_1$ is the surface tension (dynes/cm) of the solution of the addition polymer in the solvent, and $b_1$ is the interfacial tension (dynes/cm) between the solvent solution and water, thereafter continuously feeding the resulting solvent solution to the surface of a liquid support consisting substantially of water from a feed means for the solvent solution in such a manner that the solvent solution does not come apart from the surface of the liquid support, thereby allowing the solvent solution to spread spontaneously on the liquid surface and continuously removing the solvent of the solvent solution to an amount sufficient to form a solid membrane, and thereafter withdrawing the resulting ultrathin solid membrane upwardly from the liquid surface while it is carried on a porous sheet-like material.

13. The process of claim 12 wherein said feed means for the solvent solution is in contact with the liquid surface, or is up to about 3 mm above the liquid surface.

14. The process of claim 12 wherein the feed means for the solvent solution is a feed opening which is apart from the liquid surface to an extent of up to about 2 mm below the liquid surface.

15. The process of claim 12 wherein the feed means for the solvent solution is an opening having an area of about 0.01 mm$^2$ to about 3 mm$^2$ provided at the end of a hollow tube.

16. The process of claim 12 wherein the solvent solution is continuously fed from the feed means at a rate of about 0.1 to about 20 cc/min.

17. The process of claim 12 wherein the liquid support is flowing.

18. The process of claim 17 wherein the solvent solution spreads spontaneously on the surface of the moving liquid support.

19. The process of claim 17 wherein before the solid membrane formed on the liquid surface is carried on the porous sheet-like material, the solid membrane is forcibly taken up at a substantially constant rate on the surface of the liquid support in the flowing direction of the liquid support to form a substantially stable flow of the solid membrane, and then the solid membrane is carried on the porous sheet-like material which is moving at a rate substantially corresponding with the rate of flowing of the solid membrane.

20. The process of claim 12 wherein the addition polymer is polyethylene, polypropylene, polybutene, polyisobutene, polypentene, polymethylpentene, polyhexene, polymethylhexene, polyheptene, polycyclohexylpentene, polystyrene, poly(α-methylstyrene), poly(1,4-butadiene), poly(1,2-butadiene), polyisoprene or polycyclooctadiene.

21. The process of claim 12 wherein the solvent solution contains about 0.5 to about 15% by weight of the addition polymer based on the solvent solution and about 0.1 to about 15% by weight of the other organic compound.

22. A solvent solution of an addition polymer suitable for forming an ultrathin solid membrane having a thickness of about 50 to about 3000 Å, said solvent solution being prepared by dissolving an addition polymer derived from at least one monomer having from 2 to 20 carbon atoms and selected from the group consisting of ethylenically unsaturated hydrocarbon monomers and conjugated unsaturated hydrocarbon monomers in a solvent composed mainly of a volatile, substantially water-immiscible organic liquid medium which is a hydrocarbon or a halogenated hydrocarbon and which is capable of dissolving the addition polymer, said solvent containing from 0.1 to 15% by weight of another organic compound selected from the group consisting of alicyclic alcohols, aromatic alcohols, ketones, aldehydes, carboxylic acids, peroxides, and mixtures thereof, said organic compound having a distribution coefficient k, which is the ratio of the concentration of the other organic solvent in the organic liquid medium to that in water, of from 0.5 to 35, and said solvent meeting the following equation $$c_1 - (a_1 + b_1) \geqq 25$$

wherein $c_1$ is the surface tension (dynes/cm) of water, $a_1$ is the surface tension (dynes/cm) of the solution of the addition polymer in the solvent, and $b_1$ is the interfacial tension (dynes/cm) between the solvent solution and water.

23. An ultrathin solid membrane having a thickness of about 50 to about 3000 Å prepared from the solvent solution of claim 22.

24. The solvent solution of claim 22 wherein the addition polymer is polyethylene, polypropylene, polybutene, polyisobutene, polypentene, polymethylpentene, polyhexene, polymethylhexene, polyheptene, polycyclohexylpentene, polystyrene, poly(α-methylstyrene), poly(1,4-butadiene), poly(1,2-butadiene), polyisoprene or polycyclooctadiene.

25. The solvent solution of claim 22 which contains about 0.5 to about 15% by weight of the addition polymer based on the solvent solution and about 0.1 to about 15% by weight of the other organic compound.

26. The solvent solution of claim 25 wherein the organic liquid medium is selected from the group consisting of cyclohexene, cyclohexane, trichloroethylene, trichloroethane, tetrachloroethane, trichloropropane and the mixtures thereof and the other organic compound is selected from the group consisting of cyclohexenol, cyclohexanol, phenol, cyclohexenone, cyclohexylamine, aniline, furfural, benzoic acid, cyclohexenyl hydroxyperoxide and the mixtures thereof.

27. A solid membrane produced by the process of any one of claims 1 to 18.

28. A process for obtaining a gas having a specified component gas concentrated therein from a gaseous mixture which comprises contacting the gaseous mixture with any one of the solid membranes of claim 27 to selectively separate the specified component gas from said gaseous mixture.

29. The process of claim 28 which is used for obtaining a gaseous mixture having enriched oxygen gas from a gaseous mixture comprising at least oxygen and nitrogen.

* * * * *

UNITED STATES PATENT AND TRADEMARK OFFICE
CERTIFICATE OF CORRECTION

PATENT NO. : 4,406,673

DATED : September 27, 1983

INVENTOR(S) : Takeyoshi Yamada; Shizuka Kurisu; Shizuo Azuma; Kiyoshi Sugie and Teizo Yamaji It is certified that error appears in the above—identified patent and that said Letters Patent is hereby corrected as shown below:

Claim 27, line 2 change "claims 1 to 18" to ---claims 1 to 21---

Signed and Sealed this

Twenty-seventh Day of December 1983

[SEAL]

Attest:

GERALD J. MOSSINGHOFF

Attesting Officer    Commissioner of Patents and Trademarks